US006967675B1

(12) United States Patent
Ito et al.

(10) Patent No.: US 6,967,675 B1
(45) Date of Patent: Nov. 22, 2005

(54) DIGITAL CAMERA WITH IMAGE FILE TRANSMISSION

(75) Inventors: Kazuo Ito, Habikino (JP); Yasuo Nozaki, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 853 days.

(21) Appl. No.: 09/695,981

(22) Filed: Oct. 26, 2000

(30) Foreign Application Priority Data

Oct. 28, 1999 (JP) .................................. 11-307764
May 20, 2000 (JP) .............................. 2000-134876

(51) Int. Cl.[7] .......................... H04N 5/225; H04N 5/76
(52) U.S. Cl. ................................ 348/207.1; 348/211.1; 348/333.05; 348/231.2
(58) Field of Search .......................... 348/211.1, 271.3, 348/211.8, 207.1, 207.11, 333.05, 333.02, 348/14.13, 231.1, 231.2, 231.3, 231.9, 211.2, 348/211.3; 709/200, 201

(56) References Cited

U.S. PATENT DOCUMENTS

| | | | | |
|---|---|---|---|---|
| 5,724,579 A | * | 3/1998 | Suzuki | 707/104.1 |
| 5,917,542 A | * | 6/1999 | Moghadam et al. | 348/231.99 |
| 6,035,323 A | * | 3/2000 | Narayen et al. | 709/201 |
| 6,201,571 B1 | * | 3/2001 | Ota | 348/239 |
| 6,204,877 B1 | * | 3/2001 | Kiyokawa | 348/211.3 |
| 6,233,015 B1 | * | 5/2001 | Miller et al. | 348/333.05 |
| 6,278,447 B1 | * | 8/2001 | Anderson | 345/723 |
| 6,307,550 B1 | * | 10/2001 | Chen et al. | 345/418 |
| 6,335,742 B1 | * | 1/2002 | Takemoto | 345/781 |
| 6,370,580 B2 | * | 4/2002 | Kriegsman | 709/226 |
| 6,405,201 B1 | * | 6/2002 | Nazari | 707/8 |
| 6,556,243 B1 | * | 4/2003 | Dotsubo et al. | 348/231.2 |
| 6,567,121 B1 | * | 5/2003 | Kuno | 348/211.3 |
| 2001/0012060 A1 | * | 8/2001 | Wakui | 348/211 |
| 2002/0021359 A1 | * | 2/2002 | Okamoto | 348/222 |

FOREIGN PATENT DOCUMENTS

JP            11191870 A   *   7/1999    ............ H04N 5/76

* cited by examiner

*Primary Examiner*—David L. Ometz
*Assistant Examiner*—Lin Ye
(74) *Attorney, Agent, or Firm*—Westerman, Hattori, Daniels & Adrian, LLP

(57) ABSTRACT

A digital camera includes an interface connected with a memory card. To the memory card is recorded an image file including a compressed main-image data and compressed thumbnail image data of a subject taken. When the operator selects a transmit mode and performs predetermined key operation, the image file recorded on the memory card is transmitted to an Internet server via a communication circuit. After completing the transmission, the image files already transmitted are erased leaving the compressed thumbnail image data.

7 Claims, 12 Drawing Sheets

DIGITAL CAMERA WITH IMAGE FILE TRANSMISSION

BACKGROUND OF THE INVENTION

1. Field of the Invention

This invention relates to a digital camera for storing and accumulating taken-image data into a high-capacity server remotely located through the Internet so that desired image data can be, as required, downloaded from the server.

2. Description of the Prior Art

In the digital camera, the subject image taken by an imager device, such as a CCD imager, is subjected to predetermined signal processing. This produces still image data to be recorded in a compressed state onto a removable recording medium. When a reproduce mode is set, still image data is reproduced from the recording medium and outputted onto a LCD monitor through the decompression process. For such digital cameras, various recording mediums are used, including memory cards incorporating a flash memory having a capacity of approximately several tens of M bytes, floppy disks, small-sized hard disks, magneto-optical disks having a capacity of approximately several hundreds of M bytes, etc. These mediums are on rapid increase in their capacity. Today, they can store increased amount of image data as compared to that several years before.

However, the data size of one still picture has increased with recent increase of pixel count of the CCD-imager. Meanwhile, the speed increase of signal processing has enabled to take a motion image. As a result, the total data amount of an image to be recorded to the recording medium has also drastically increased. The user who is to take a picture is required to be conscious of if sufficient vacant capacity is available in the recording medium.

SUMMARY OF THE INVENTION

Therefore, it is a primary object of the present invention to provide a digital camera capable of taking subjects without paying attentions to the memory capacity.

According to the present invention, a digital camera for recording to a recording medium an image file including a main-image signal and a size-reduced image signal of a subject taken comprises: a first transmitter for transmitting a plurality of the image files recorded in the recording medium to an external storage device; an eraser for erasing from the recording medium the plurality of image files transmitted by the first transmitter; a first receiver for receiving a plurality of the size-reduced image signals from the external storage device; a selector for selecting a desired size-reduced image signal from among the plurality of size-reduced image signals received by the first receiver; and a second receiver for receiving from the external storage device the image file including the desired size-reduced image signal selected by the selector.

An image file including a main-image signal and a size-reduced image signal of a subject taken is recorded to the recording medium. The image files recorded are transmitted to the external storage device by the first transmitter. The image files transmitted are erased from the recording medium by the eraser. A plurality of the size-reduced image signals are received from the external storage device by the first receiver. If a desired size-reduced image signal is selected from among the plurality of size-reduced image signals received by the selector, the second receiver receives from the external storage device the image file including the desired size-reduce image signal selected.

Because the image files recorded in the recording medium are transmitted to the external storage medium, the operator is allowed to continue to take pictures without paying attention to the capacity of the recording medium. Also, because the already-transmitted image files are erased by the eraser, it is possible to omit the labor and time that the operator manually transmits image files. Furthermore, a desired size-reduced image signal is selected from among the size-reduced image signals received from the external storage device whereby a corresponding image file is received. Accordingly, the image file can be easily restored to hand.

In one embodiment of the invention, the first receiver includes a date inputter, a date information transmitter and a size-reduced image signal receiver. If a date inputter to inputs a desired date, a date information transmitter transmits date information representative of the desired date to the external storage device. Thereupon, a size-reduced image signal receiver receives from the external storage device the plurality of size-reduced image signals generated on the desired date.

In another embodiment of the invention, the selector includes a displayer. The displayer displays a plurality of size-reduced images based on the plurality of size-reduced image signals received by the first receiver. A size-reduced image selector selects a desired size-reduced image from among the plurality of size-reduced images displayed by the displayer.

According to the invention, a digital camera for recording to a recording medium an image file including a main-image signal and a size-reduced image signal of a subject taken comprises: a transmitter for transmitting to an external storage device the image file recorded in the recording medium; a storage for storing in a nonvolatile memory area the size-reduced image signal included in the image file transmitted by the transmitter; and an eraser for erasing from the recording medium the image file transmitted by the transmitter.

The recording medium records an image file including a main-image signal and a size-reduce image signal of a subject taken. When a transmitter transmits to an external storage device the image file recorded in the recording medium, a storage stores in a nonvolatile memory area the size-reduced image signal included in this image file. Also, an eraser erases from the recording medium the image file transmitted.

Because the image files recorded in the recording medium is stored in the externally provided storage device in this manner, the operator can continue to take pictures without paying attention to the capacity of recording medium. Also, the transmitted image files are erased leaving size-reduced image signals, it is possible for the operator to omit the labor and time of manually erasing the image files. Further, the content of the image files stored in the external storage device can be easily confirmed by the size-reduced image signals.

In one embodiment of the invention, an image file selector is further provided to select a desired image file from among a plurality of the image files recorded in the recording medium. In this case, the transmitter transmits the desired image file and the storage stores in the memory area the size-reduced image signal included in the desired image file. The eraser erases from the recording medium the desired image file.

In another embodiment of the invention, when a reproducer for reproducing a plurality of the size-reduced image signals stored in the memory area, a displayer displays a plurality of size-reduced images based on the plurality of size-reduced image signals reproduced by the reproducer. When a size-reduced image selector selects a desired size-reduced image from among the plurality of size-reduced images displayed, a receiver receives from the external storage device the image file corresponding to the size-reduced image selected.

In still another embodiment of the invention, an adder adds print-job information to the image file prior to transmitting the image file.

In yet another embodiment of the invention, the nonvolatile memory area is formed in the recording medium.

According to the invention, a digital camera for transmitting to an external storage device an image signal of a subject taken comprises: a detector for detecting a relationship in magnitude between a vacant capacity of the external storage device and a size of the image signal; a first transmitter for transmitting an extension request for the vacant capacity to the external storage device based on a result of detection by the detector; and a second transmitter for transmitting the image signal to the external storage device after the vacant space bas been extended in response to the extension request.

The image signal of a subject taken by the digital camera is sent to the external storage device. The relationship in magnitude between the vacant capacity of the external storage medium and the to-be-transmitted image signal is detected by the detector. The first transmitter transmits a vacant-capacity extension request to the external storage device based on a result of detection by the detector. If the vacant capacity is extended in response to the extension request, the second transmitter transmits the image signal to the external storage device.

Because the vacant capacity of the external storage medium is extended based on a relationship in magnitude of the vacant capacity of the external storage medium and the to-be-transmitted image signal, the operator is allowed to continue to take pictures without conscious of the vacant capacity of the external storage device.

In one embodiment of the invention, a prompter prompts the vacant capacity to extend when the vacant capacity is lower than the size. Here, if an instructor instructs an extension of the vacant capacity, the first transmitter transmits the extension request in response to an instruction by the instructor.

Preferably, the capacity of the external storage device is on sale on a predetermined-size basis and the instruction of the instructor is an instruction for purchasing a capacity of the predetermined size.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
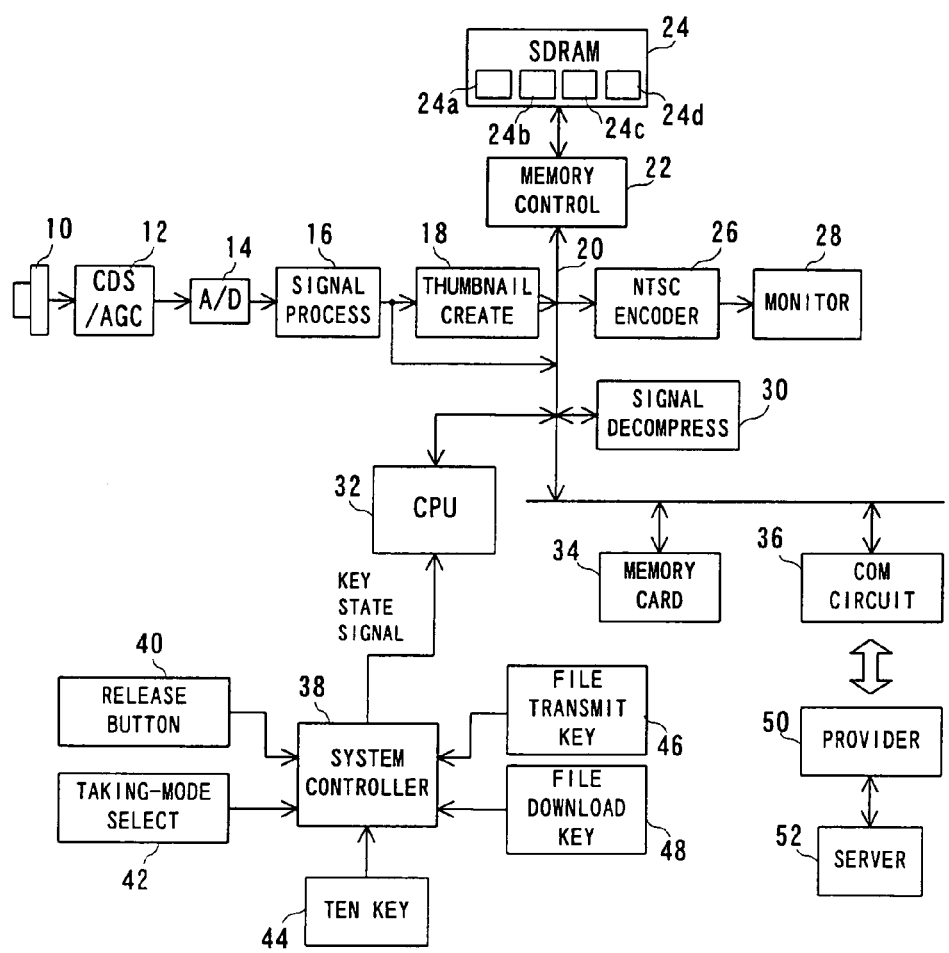
FIG. 1 is a block diagram showing one embodiment of the present invention.

Referring to FIG. 1, a digital camera of this embodiment includes a system controller 38. The system controller 38 is to be selected in a still-picture taking mode by a taking-mode select switch 42 and, at operating a release button 40, supplies a corresponding key state signal to a CPU 32. Thereupon, the CPU 32 starts up a picture-taking system including a CCD imager 10, a CDS/AGC circuit 12, an A/D converter 14, a signal processing circuit 16 and a thumbnail creator circuit 18.

The CCD imager 10 performs photoelectric conversion on a subject optical image given through a lens (not shown) to produce image signals (electric charges) and outputs the produced image signals by the raster-scan scheme. The output image signal is removed of noise and adjusted in level by the CDS/AGC circuit 12 and converted into image data (digital signal) by the A/D converter 14. The signal processing circuit 16 performs signal processing, such as color separation and YUV conversion, on the image data and creates image data (main-image data) comprising luminance data and two kinds of color-difference data. The produced main-image data is delivered to a memory control circuit 22 via a bus 20 and stored in a main-image storage area 24a of an SDRAM 24 by the memory control circuit 22.

The main-image data produced by the signal processing circuit 16 is also supplied to the thumbnail creator circuit 18. The thumbnail creator circuit 18 performs thinning-out on the supplied main-image data to produce thumbnail image data and sends the created thumbnail image data to the memory control circuit 22 through the bus 20. The thumbnail image data is then stored to a thumbnail image storage area 24b by the memory control circuit 22.

The CPU 32 disables the picture-taking system at a time that the thumbnail image data has been stored in the SDRAM 24, and in turn supplies a main-image compressing command and thumbnail compressing command to the image compression/decompression circuit 30. A main-image compressing command is first outputted. The image compression/decompression circuit 30 reads out main-image data stored in the main-image storage area 24*a* through the memory control circuit 22 and conducts image compression confirming to the JPEG format. The compressed main-image data produced by the compression process is stored to a compressed main-image storage area 24*c* of the SDRAM 24 through the memory control circuit 22. Subsequently, when a thumbnail compressing command is outputted, the image compression/decompression circuit 30 reads out the thumbnail image data stored in the compressed thumbnail image storage area 24*d* through the memory control circuit 22 and performs JPEG compression similarly to the above. This produces compressed thumbnail image data to be stored in a compressed-thumbnail-image storage area 24*d* of the SDRAM through the memory control circuit 22.

Obtaining the compressed main-image data and compressed thumbnail image data as above, the CPU 32 reads out these of compressed data through the memory control circuit 22 and records them as still image files to a memory card 34. Here, the compressed thumbnail image data serves as index information for the still picture files. Also, the still picture file at its header is given a file name, a picture taking date and an escape identifier representative of a JPEG file.

Incidentally, the memory card 34 is a nonvolatile recording medium to be removably loaded in the digital camera, which in actual is connected to the bus 20 through an interface.

Meanwhile, in a state that a motion-picture taking mode is selected by the taking-mode select switch 42, when the release button 40 is pressed, the CPU 32 continues starting up the picture-taking system over a time the release button 40 is being pressed and repeatedly supplies main-image compressing commands at an interval of $\frac{1}{15}$th of a second to the image compression/decompression circuit 30. The CCD imager 10 outputs frames of image signals, for example, at an interval of $\frac{1}{15}$th of a second, and the main-image data stored in the main-image storage area 24*a* is updated at an interval of $\frac{1}{15}$th of a second. It should be however noted that, because the thumbnail creator circuit 18 is disabled at a time that a first frame of thumbnail image data has been produced, the first frame of thumbnail image data stored in the thumbnail image storage area 24*b* will not be updated by the following thumbnail image data.

The image compression/decompression circuit 30 compresses the main-image data in response to a compressing command, in a manner similarly to the above. The main-image data stored in the main-image storage area 24*a* is sequentially subjected to compression processing. The frames of compressed main-image data are successively accumulated to the compressed main-image storage area 24*c* of the SDRAM 24. When the release button is released from depression, the CPU 32 sends a thumbnail image compressing command to the image compression/decompression circuit 30. Thereupon, the image compression/decompression circuit 30 compresses the thumbnail image data in a manner similar to the above, and stores the compressed thumbnail image data to the compressed thumbnail image storage area 24*d*.

After obtaining a plurality of frames of compressed main-image data and one frame of compressed thumbnail image data, the CPU 32 records these of compressed data as motion-picture files (motion JPEG files) to the memory card 34. The compressed thumbnail image data, even if in a motion image file form, serves as index information. Also, to the header of the motion image file is given a file name, a picture-taking date and an escape identifier (MOV) representative of a motion image file.

By the repetition of taking still or motion images as above, still or motion image files are accumulated up within the memory card 34 and the vacant capacity is correspondingly decreased in the memory card 34. In order for restoration from the vacant capacity inside the memory card 34, the operator may operate a file-transmit key 46. This causes a communication circuit 36 having a data-communication function as that of a portable communication terminal to make dialing to an Internet service provider 50. When a connection is once established, a URL of a data base server (external memory device) 52 is transmitted over the Internet thereby getting an access to the server 52 through the provider 50. Once the access to the server 52 becomes available, the still or motion image files accumulated on the memory card 34 can be sent to the server 52 by operator's predetermined key operation. A 10 G-bytes user area is secured on the data base server 52 on the basis of a contract with the operator. The sent still or motion image file is received in the user area. After all the image files has been transferred from the memory card 34, the CPU 32 erases all the accumulated image files from the memory card 34. This restores the vacant capacity inside the memory card 34.

Incidentally, in the case that the vacant capacity of the user area is decreased, the operator can purchase an additional user area (30 M bytes) by performing predetermined key operation. Accordingly, after the initial 10 G-bytes user area becomes full, the image files may be stored to an additional area.

On the other hand, when it is desired to download a particular image file (still or motion image file) stored in the data base server 52 to the digital camera, the operator may operate a file download key 48. Thereupon, the communication circuit 36 makes dialing to the provider 50 and gets an access to the server 52. After establishing a connection to the server 52, if the operator designates a desired date, an image file created on that designated date is detected on the server 52 side. Thus, downloaded is the compressed thumbnail image data included in the detected image file. The downloaded compressed thumbnail image data is stored to the compressed thumbnail image storage area 24*d* through the memory control circuit 22.

Completing the download, the CPU 32 supplies a thumbnail image decompressing command to the image compression/decompression circuit 30. The image compression/decompression circuit 30 reads out the compressed thumbnail image data through the memory control circuit 22 and performs JPEG decompression on it. The decompressed thumbnail image data is stored to the main-image storage area 24*a* through the memory control circuit 22. That is, the main-image storage area 24*a*, when displaying an image on a LCD monitor 28, serves as a VRAM. The decompressed thumbnail image data is stored not to the thumbnail image area 24*b* but to the main-image storage area 24*a*. An NTSC encoder 26 reads the image data out of the main-image storage area 24*a* through the memory control circuit 22 and converts the read-out image data into an NTSC-formatted composite image signal. The converted composite image signal is supplied to the incorporated LCD monitor 28. As a result, a thumbnail image is displayed on the LCD monitor 28.

Incidentally, when compressed thumbnail image data is extracted from a plurality of image files and downloaded, a plurality of screens of thumbnail image data are stored in the main-image storage area 24*a* so that a plurality of thumbnail images area multi-displayed on the LCD monitor 28.

In a state that thumbnail images are multi-displayed, when the operator selects a desired thumbnail image by the ten key 44, selection information is transmitted to the server 52. Thereupon, the server 52 specifies an image file corresponding to the sent selection information and transmits the specified image file. The CPU 32 downloads the image file transmitted from the server 52 through the communication circuit 36 and records it onto the memory card 34. Also, the compressed main-image data contained in the downloaded image file is stored to the compressed main-image storage area 24c through the memory control circuit 22, and a main-image decompressing command is sent to the image compression/decompression circuit 30. The compressed main-image data stored in the compressed main-image storage area 24c is decompressed by the image compression/decompression circuit 30. The decompressed main-image data is stored in the main-image storage area 24a. Due to this the thumbnail image data stored in the main-image storage area 24a is overwritten by the decompressed main-image data. The NTSC encoder 26 performs encode processing on the image data stored in the main-image storage area 24a similarly to the above and supplies an encoded composite image signal to the LCD monitor 28. As a result, the thumbnail images multi-displayed are updated by a main image corresponding to a thumbnail image selected by the operator.

Incidentally, when a motion image file is downloaded, a plurality of frames of compressed main-image data area transferred from the memory card 34 to the compressed main-image storage area 24c and compressed main-image data of each frame is decompressed at an interval of ⅕sth of a second. As a result, a motion picture comprising a plurality of frames of decompressed main images is displayed on the monitor 28.

Figure 2:
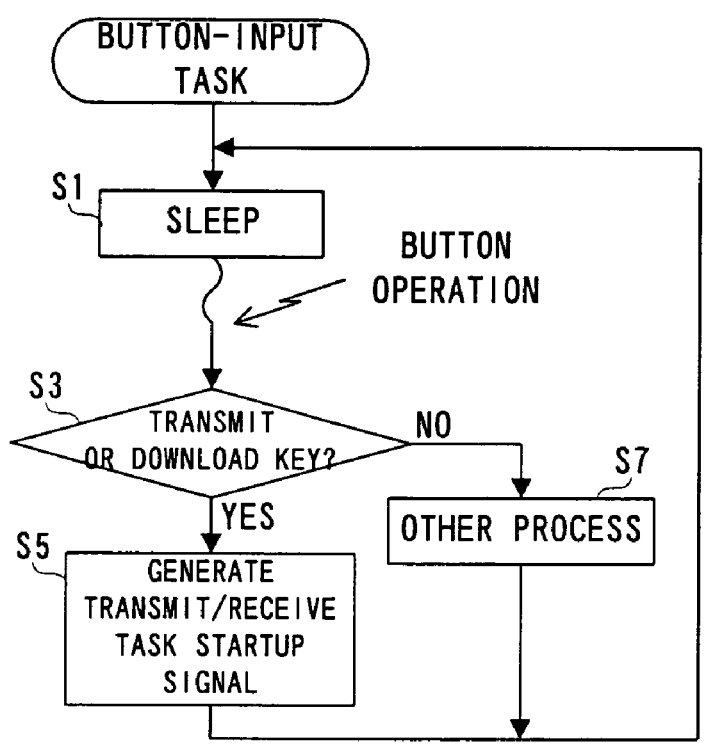
FIG. 2 is a flowchart showing one part of operation of the FIG. 1 embodiment.
Figure 3:
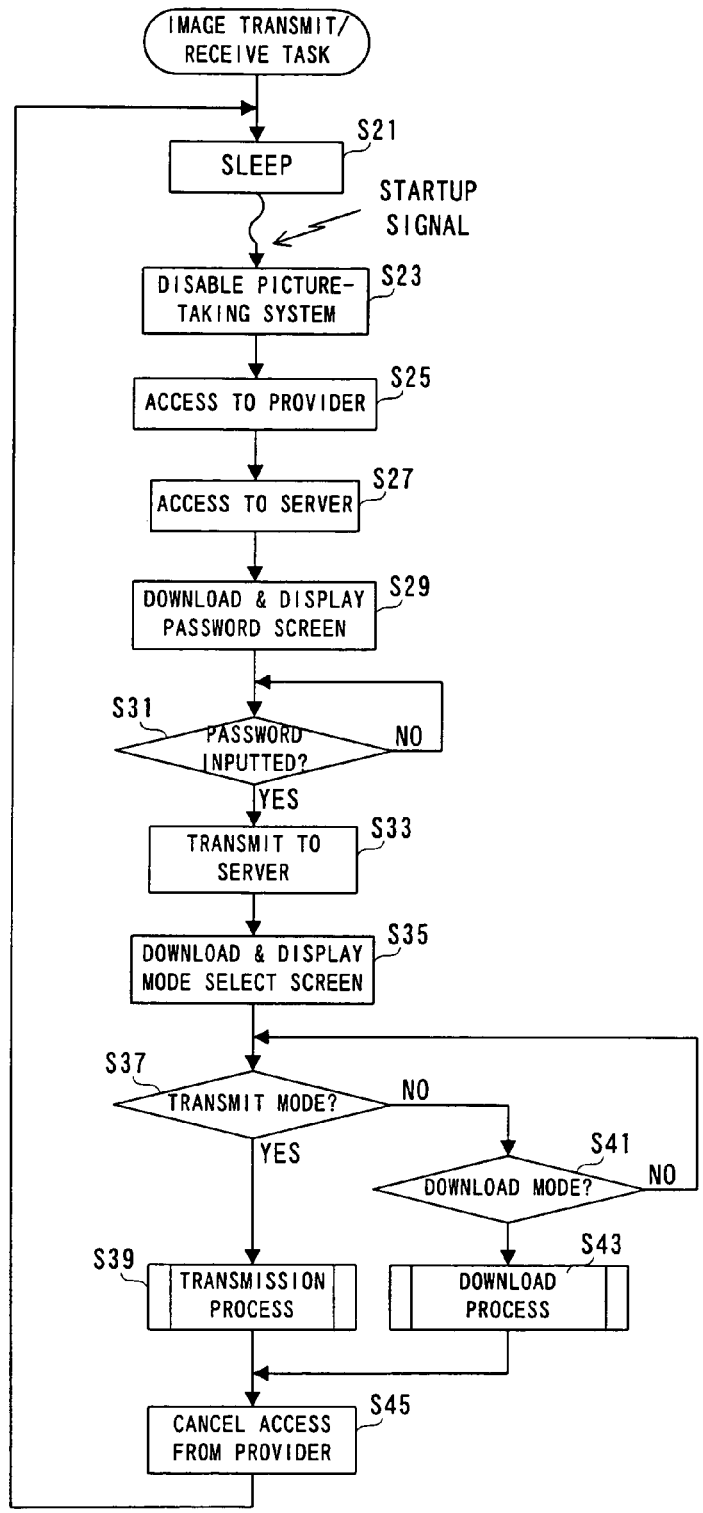
FIG. 3 is a flowchart showing another part of operation of the FIG. 1 embodiment.
Figure 4:
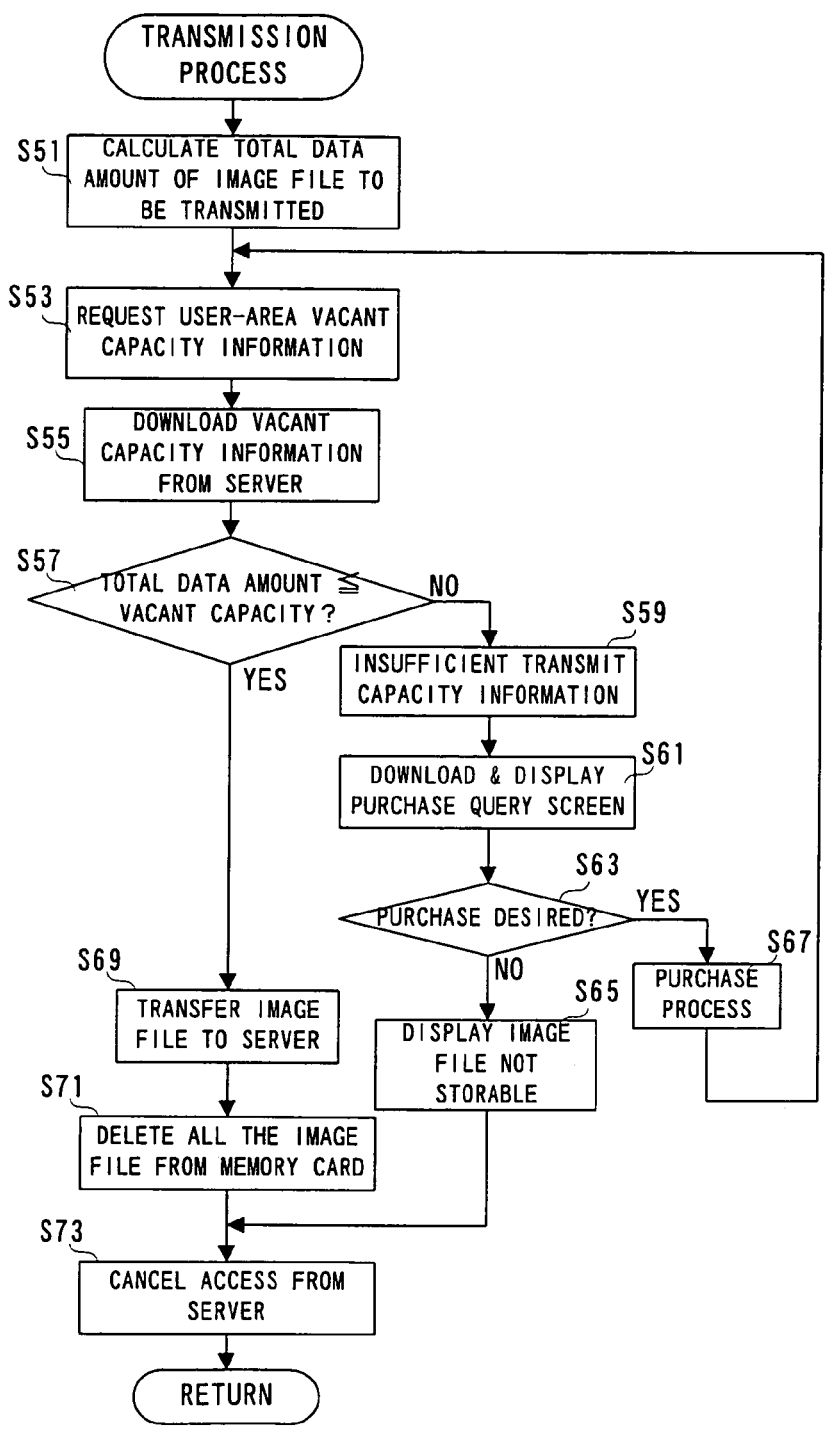
FIG. 4 is a flowchart showing still another part of operation of the FIG. 1 embodiment.
Figure 5:
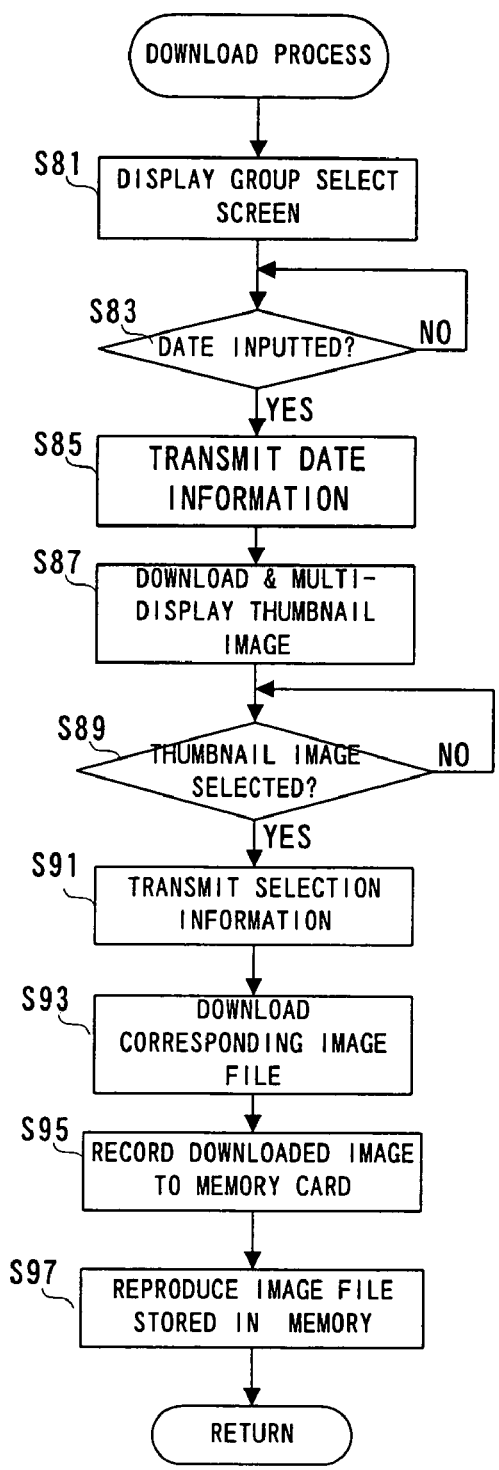
FIG. 5 is a flowchart showing yet another part of operation of the FIG. 1 embodiment.

The CPU 32 concretely processes a flowchart shown in FIG. 2 to FIG. 5 when it sends an image file to the server 52 or downloads an image file from the server 52. Here, FIG. 2 shows a button-input task and FIG. 3 an image-transmitting/receiving task. Also, FIG. 4 and FIG. 5 show respective subroutines of transmission and download processes.

Referring first to FIG. 2, if an operator operates any of the release button 40, the taking-mode select switch 42, the ten key 44, the file-transmit key 46 and a file download key 48, the process restores from a sleep state in step S1 to determine in step S3 whether any button was operated or not. If an operated button herein is the file-transmit key 46 or the file download key 48, the process proceeds from the step S3 to step S5 to generate a transmission/reception task startup signal. On the other hand, if the operated button is the release button 40, the taking-mode select switch 42 or the ten key 44, the process proceeds from the step S3 to S7 to perform another process. After completing the process of the step S5 or step S7, the CPU 32 returns to the step S1.

When a transmission/reception task startup signal is generated in the step S5, the CPU 32 restores an image transmission/reception task shown in FIG. 3 from a sleep state of step S21. Then, in step S23 the picture-taking system is disabled and, in step S25, connection is made to the provider 50. That is, the communication circuit 36 is controlled to make dialing to the provider 50 to establish connection to the provider 50. After establishing a connection state, in step S27 an URL of the server 52 is transmitted to the provider 50 thereby making an access to the server 52.

Figure 11:
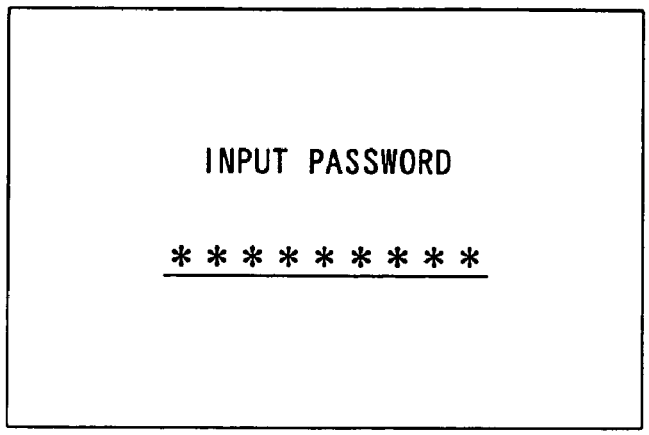
FIG. 11 is an illustrative view showing an example of a password input screen.

When communication is made possible to and from the server, the server 52 transmits a password screen of image data. In step S29, this password screen of image data is downloaded from the server 52 and the downloaded image data is written to the main-image storage area 24a of the SDRAM 24 through the memory control circuit 22. This image data is read out by the NTSC encoder 26 through the memory control circuit 22 and converted into a composite image signal. As a result, a download screen shown in FIG. 11 is displayed on the LCD monitor 28.

Figure 12:
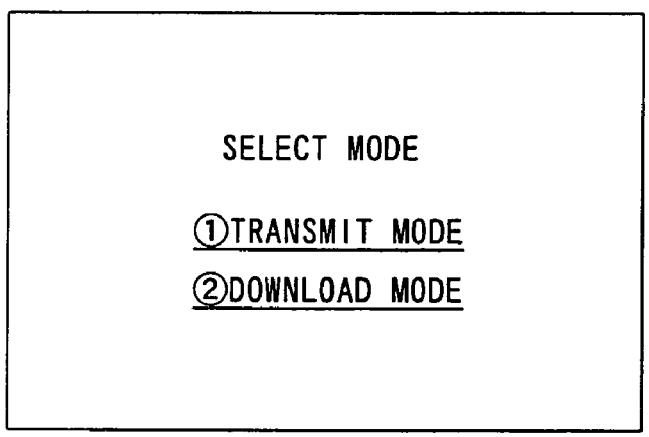
FIG. 12 is an illustrative view showing one example of a mode select screen.

In step S31, it is determined whether the operator input a password or not. If "YES", the input password is transmitted, in step S31, to the server 52. The server 52, when the password is correct, transmits a mode select screen of image data. In step S33, the image data transmitted from the server 52 is downloaded and processed similarly to the step S27. As a result, a mode select screen shown in FIG. 12 is displayed on the LCD monitor 28.

Responsive to the mode select screen, when the operator selects a transmission mode by the ten key 44, the CPU 32 in step S37 determines "YES" and, in step S39, executes a transmission process. On the other hand, when the user selects a download mode by the ten key 44, the CPU 32 in step S41 determines "YES" and executes a download process in step S43. When the process of the step S39 or S43 is completed, then in step S45 the connection to the provider 50 is cancelled and the process returns to the step S21.

Figure 13:
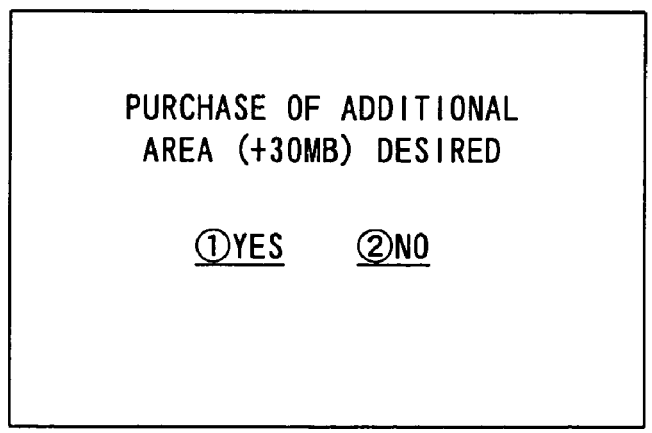
FIG. 13 is an illustrative view showing one example of a purchase query screen.

In step S39, the CPU 32 processes a subroutine shown in FIG. 4. First, calculated in step S51 a total data amount of a transmission image file (all the image files recorded in the memory card 34). Next, in step S53 a request is made to the server 52 to transmit vacant capacity information about the user area, and in step S55 vacant capacity information is downloaded from the server 52. In step S57, comparison is made between a total data amount and a vacant capacity. If the total data amount is greater than the vacant capacity, in step S59 information of capacity insufficiency is sent to the server 52. The server 52 transmits a purchase query screen of image data in response to the capacity-insufficiency information. Consequently, in step S61 the purchase query screen of image data is downloaded to execute the same process as that of the step S27. As a result, a purchase query screen shown in FIG. 13 is displayed on the LCD monitor 28.

Figure 14:
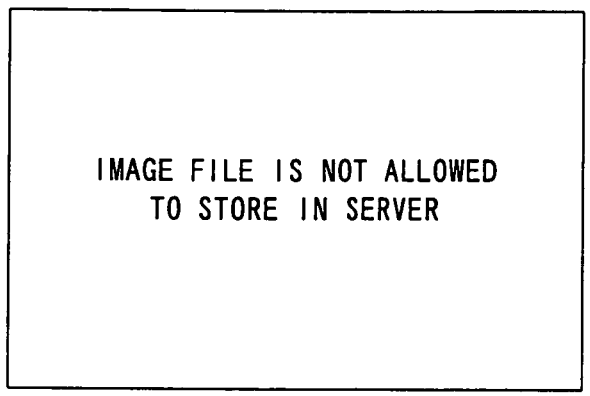
FIG. 14 is an illustrative view showing an example of an image-file storage reject screen.

Responsive to the purchase query screen, if the operator select "YES" by the ten key 44, the CPU 32 advances from step S63 to step S67 to perform a process of purchasing an additional area (30 M bytes). This provides an extension of 30 Mbytes to the user area. After completing the purchase process, process returns to the step S53. On the other hand, if the operator selects "NO" by the ten key 44, the CPU 32 advances from the step S63 to step S65 to display a storage-impossible screen as shown in FIG. 14 on the LCD monitor 28. Thereafter, in step S73 the connection to the server 52 is cancelled and then the process returns to the image transmission/reception task shown in FIG. 3.

On the other hand, if it is determined in step S55 that the total data amount is greater than the vacant capacity, the process advances to step S69 to transmit all the image files recorded on the memory card 34 to the server 52. Specifically, all the image files are first stored to the compressed main-image storage area 24b and thereafter transferred to the server 52 through the communication circuit 36. After completing the transfer process, all the image files are deleted from the memory card 34 in step S71. After deleting all the image files, the process returns to the image transmission/reception task shown in FIG. 3 through a disconnection process from the server 52 of step S73.

Figure 15:
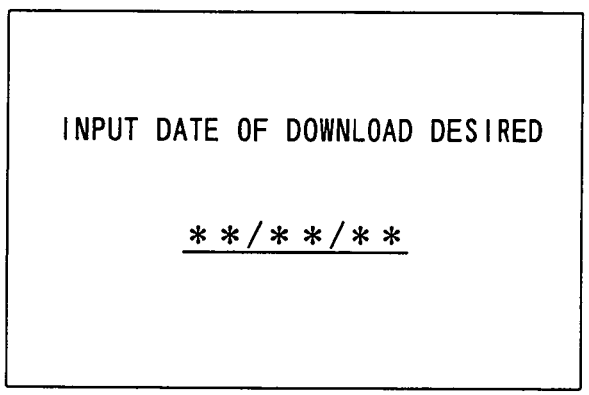
FIG. 15 is an illustrative view showing an example of a group select screen.

In the step S43 shown in FIG. 3, the CPU 32 executes a download process shown in FIG. 5. At first, in step S81, a group select screen shown in FIG. 15 is displayed on the LCD monitor 28 and then, in step S83, a creation date of a desired image file is waited to input. If the operator inputs a desired date by the ten key 44, date data is transmitted in step S85 to the server 52. The server 52 extracts an image file corresponding to the transmitted date data from the user area and takes compressed thumbnail image data out of the extracted image file. Then, the compressed thumbnail image data thus taken out is transmitted.

In step S87, the compressed thumbnail image data transmitted from the server 52 is downloaded to the compressed thumbnail image storage area 24d of the SDRAM 24. The image compression/decompression circuit 30 is instructed to make a decompression process on the compressed thumbnail image data. The compressed thumbnail image data is read out through the memory control circuit 22 and decompressed by the image compression/decompression circuit 30. The decompressed thumbnail image data is stored to the main-image storage area 24a and thereafter delivered to the NTSC encoder 26 through the memory control circuit 22. The NTSC encoder 26 converts the received thumbnail image data into a composite image signal. As a result, a plurality of thumbnail pictures are multi-displayed on the LCD monitor 28.

In step S89, it is determined whether a desired thumbnail image has been selected by the ten key or not. If "YES", in step S91 selection information is transmitted to the server 52. The server 52 specifies a desired image file from the user area based on the transmitted selection information, and transmits the specified image file. In step S93, the image file transmitted from the server 52 is downloaded and, in the following step S95, the downloaded image file is recorded onto the memory card 34. In step S97, the compressed main-image data contained in the downloaded image file is reproduced.

Specifically, the compressed main-image data is stored to the compressed main-image storage area 24c through the memory control circuit 22 and a main-image decompressing command is given to the image compression/decompression circuit 30. The image compression/decompression circuit 30 reads out the compressed main-image data stored in the compressed main-image storage area 24c through the memory control circuit 22 and performs JPEG decompression on the read-out compressed main-image data. The decompressed main-image data is stored to the main-image storage area 24a through the memory control circuit 22 and thereafter converted into a composite image signal by the NTSC encoder 26. As a result, a main picture same as the selected thumbnail image is displayed on the entire screen of the LCD monitor 28. In the case that the downloaded image file is a motion image file, a plurality of frames of compressed main-image data are stored to the compressed main-image storage area 24c and frames of compressed main-image data are sequentially decompressed at an interval of 1/15th of a second. As a result, a motion picture comprising a plurality of decompressed main images is displayed on the monitor 28. After completing the process of step S97, the process returns to the image transmission/reception task shown in FIG. 3.

According to this embodiment, if a transmission mode is selected, all the image files accumulated in the memory card 34 are saved to the server 52 located at a remote site and the image files in the memory card 34 are deleted. Accordingly, the operator is allowed to continue to take pictures without paying attention to the vacant capacity of the memory card 34. Also, where the vacant capacity of the server 52 decreases lower than the size of the image file, the user area can be extended by conducting a purchase procedure. Thus, the operator can continue to take pictures without paying attention to the user-area vacant capacity. Furthermore, because the image files saved in the server 52 is to be downloaded by selecting a download mode, it is possible to easily view a picture content by the built-in LCD monitor 28.

Figure 6:
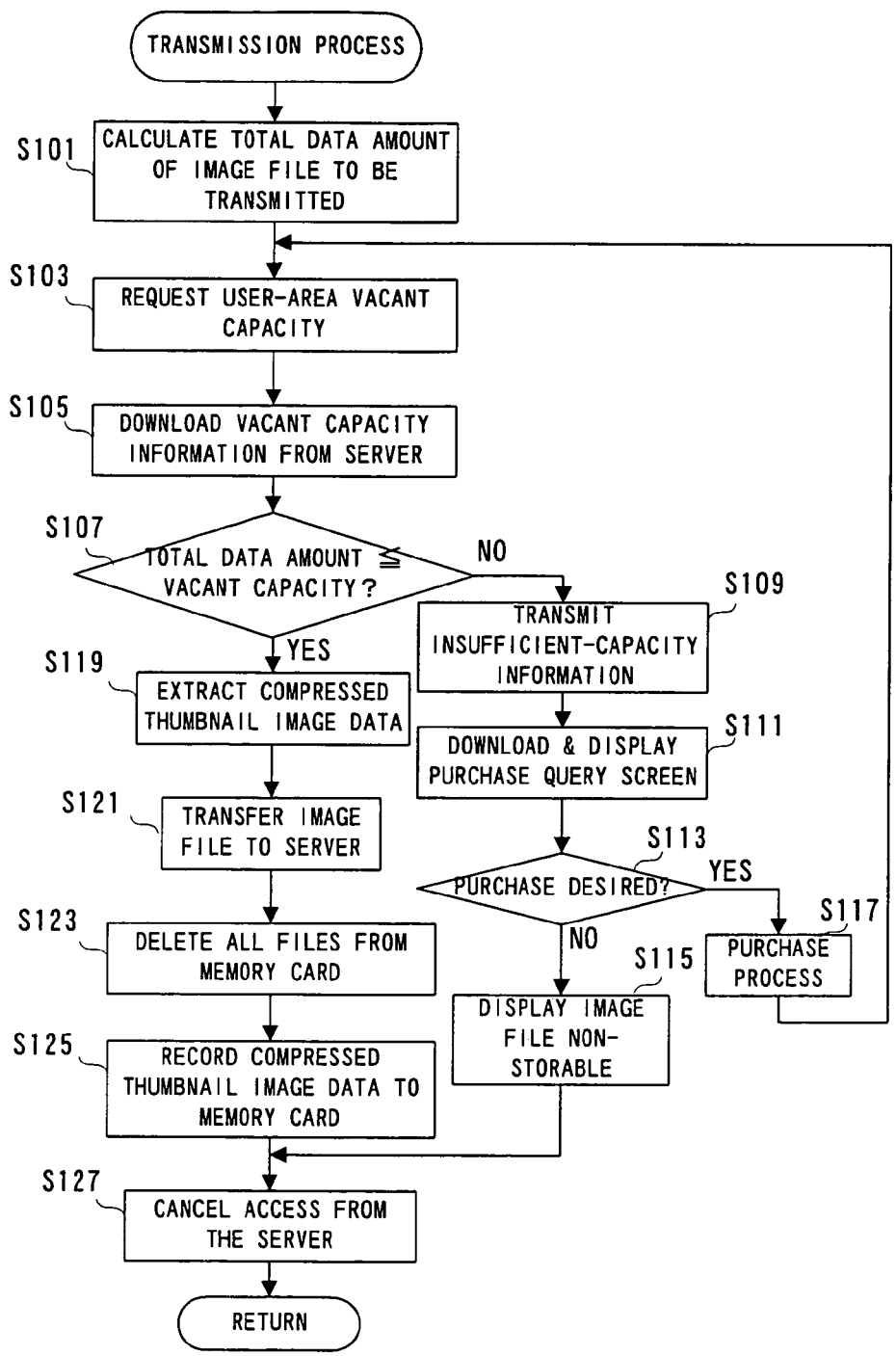
FIG. 6 is a flowchart showing one part of operation of another embodiment of the invention.
Figure 7:
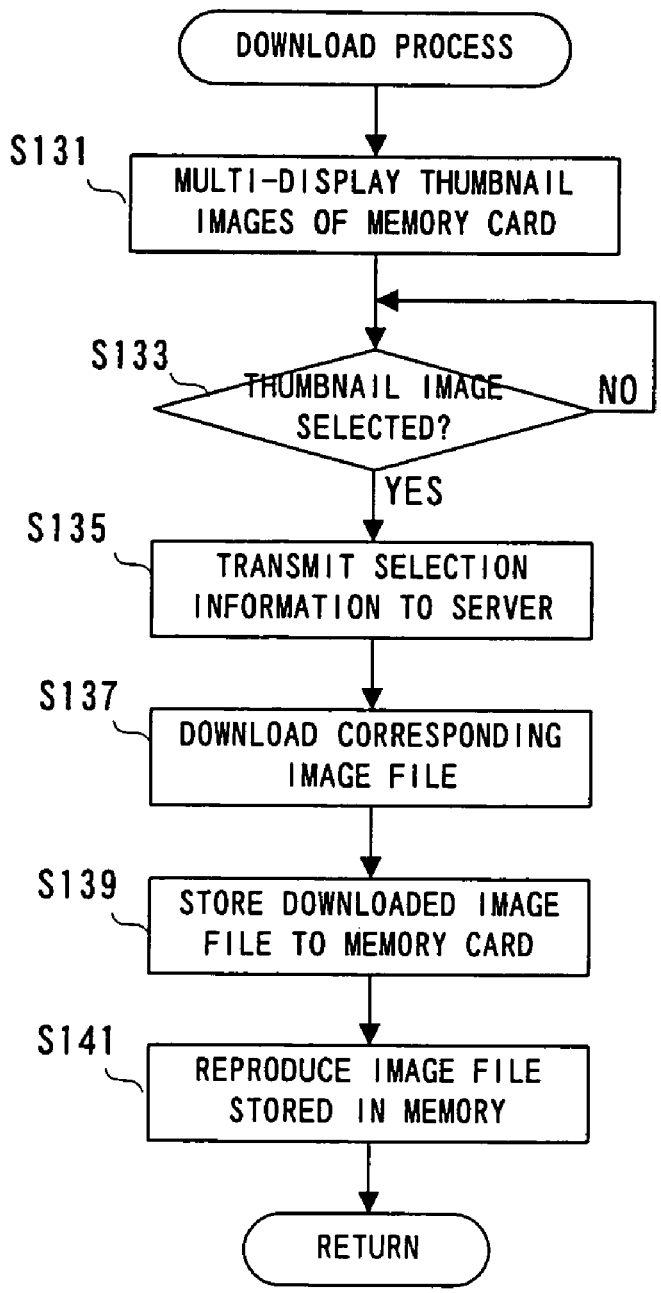
FIG. 7 is a flowchart showing another part of the other embodiment of the invention.

A digital camera of another embodiment is similar to the FIG. 1 embodiment except in that the subroutines of FIG. 6 and FIG. 7 are to be processed respectively in steps S39 and S43 of FIG. 3. Hence, duplicated explanations will be omitted.

Referring first to FIG. 6, in steps S91 to S117, similar process is made to that of the steps S51 to S67 of FIG. 4 and, in steps S121, S123 and S127, similar process is made to that of the steps S69 to S73 of FIG. 4. The difference from the process of FIG. 4 lies in that the processes of the steps S119 and S125 are added. In step S119, compressed thumbnail image data is extracted from each image file to be transmitted to the server 52. The extracted compressed thumbnail image data is stored to the compressed thumbnail image storage area 24d through the memory control circuit 22. In step S125, the compressed thumbnail image data stored in the compressed thumbnail image storage area 24d is read out through the memory control circuit 22 and recorded to a predetermined area of the memory card 34. That is, prior to transferring the image files accumulated in the memory card 34 to the server 52, the compressed thumbnail image data contained in the image files is read out and stored to the SDRAM 24. The read-out compressed thumbnail image data is returned to the memory card 34 after all the image files have been transferred. Because the memory card 34 is nonvolatile, the compressed thumbnail image data will not disappear even if the power is put off.

Referring subsequently to FIG. 7, in steps S133 to S141, a similar process to that of the steps S89 to S97 of FIG. 5 is carried out. The difference from the process of FIG. 5 lies in that the compressed thumbnail image data stored in the memory card 34 in the step S131 is reproduced and multi-displayed on the LCD monitor 28. In this embodiment, after the image files have been transferred to the server 52, the compressed thumbnail image data only is left in the memory card 34. Consequently, the compressed thumbnail image data in the memory card 34 is reproduced without downloading the compressed thumbnail image data as is made in FIG. 5.

According to this embodiment, because of no necessity of downloading the compressed thumbnail image data, it is possible to confirm simply and swiftly as to what image file is being saved in the server 52.

Figure 9:
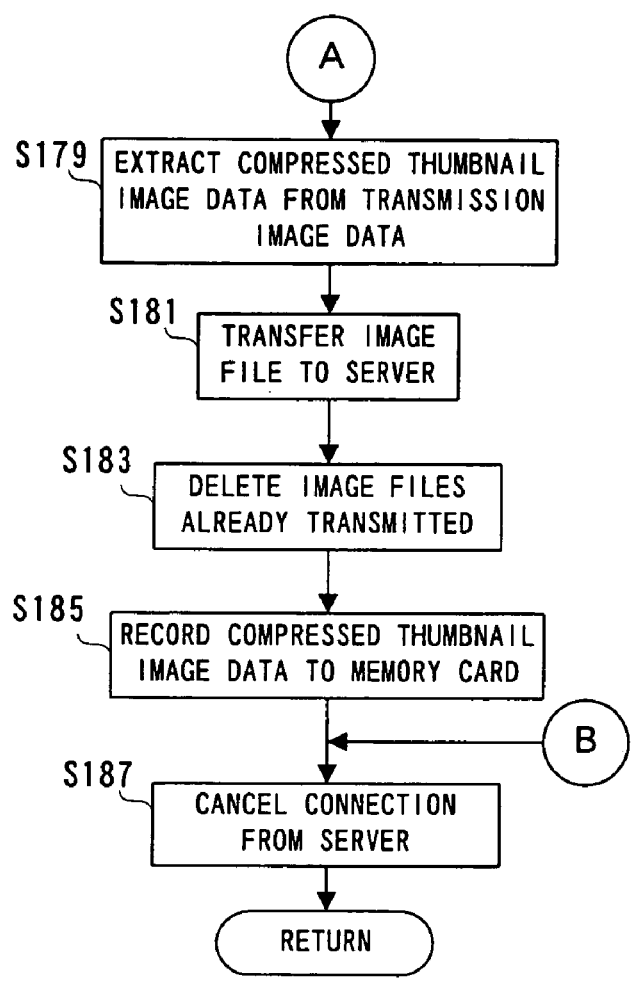
FIG. 9 is a flowchart showing another part of operation of the other embodiment of the invention.

A digital camera of still another embodiment is similar to the above other embodiment except in that a subroutine of FIG. 1 and FIG. 9 is to be processed in step S39 of FIG. 3. Hence, duplicated explanations will be omitted as large as possible.

Figure 8:
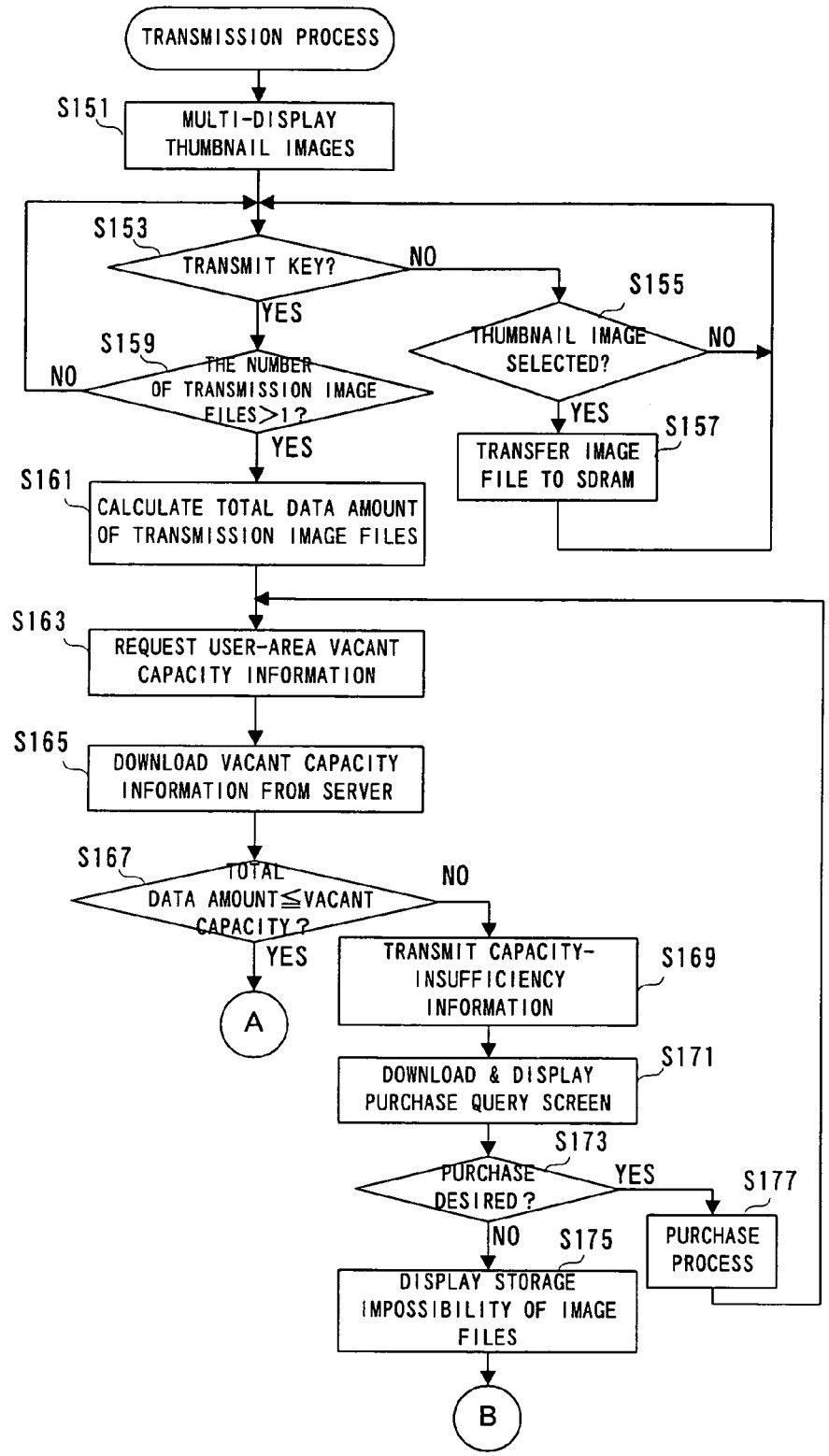
FIG. 8 is a flowchart showing part of operation of still another embodiment of the invention.

Referring to FIG. 8, the CPU 32 first, in step S151, reproduces the compressed thumbnail image data contained in the image files accumulated in the memory card 34 and multi-displays a plurality of thumbnail pictures on the LCD monitor 28. Subsequently, it is determined in step S153 whether the file-transmit key 46 was pressed or not. It is determined in step S155 whether or not any of the thumbnail images was selected by the ten key 44. If a thumbnail image is selected by the ten key 44, the process advances to step S157 to store an image file corresponding to the selected thumbnail image as a transmission image file to the compressed main-image storage area 24c. On the other hand, if the file-transmit key 46 is pressed, the process proceeds to step S159 to determine whether one or more transmission image files exist or not. If no transmission image file exists, the process returns to the step S153. However, if one or more transmission image files exist, the process of step S161 and the subsequent are executed. Incidentally, in steps S161 to S177, a similar process to that of steps S101 to S117 of FIG. 6 is to be made, hence duplicated explanation being omitted.

If it is determined in step S167 that the total data amount is equal to or smaller than the vacant capacity, the process proceeds to step S179 to extract compressed thumbnail image data from the transmitting image files stored in the compressed main-image storage area 24c. The extracted compressed thumbnail image data is stored in the compressed thumbnail image storage area 24d. After completing the process of the step S179, in step S181 the to-be-transmitted image file within the compressed main-image storage area 24c is transmitted to the server 52 and, in step S183, the image files already transmitted are deleted from the memory card 34. Thereafter, in step S185, the compressed thumbnail image data stored in the compressed thumbnail image storage area 24d is recorded to the predetermined area of the memory card 34. After ending the process of the step S185, in step S187 the connection is cancelled from the server 52, and then the process returns to the image transmission/reception task of FIG. 3.

According to this embodiment, only the image files selected by the operator are sent to the server 52 and the compressed thumbnail image data relating to the transmitted image files is left in the memory card 34. Consequently, the operator is allowed to arbitrary select an image file desired saved in the server 52. Furthermore, the operator can easily, swiftly confirm from the on-hand compressed thumbnail image data as to what image files are currently saved in the server 52.

Figure 10:
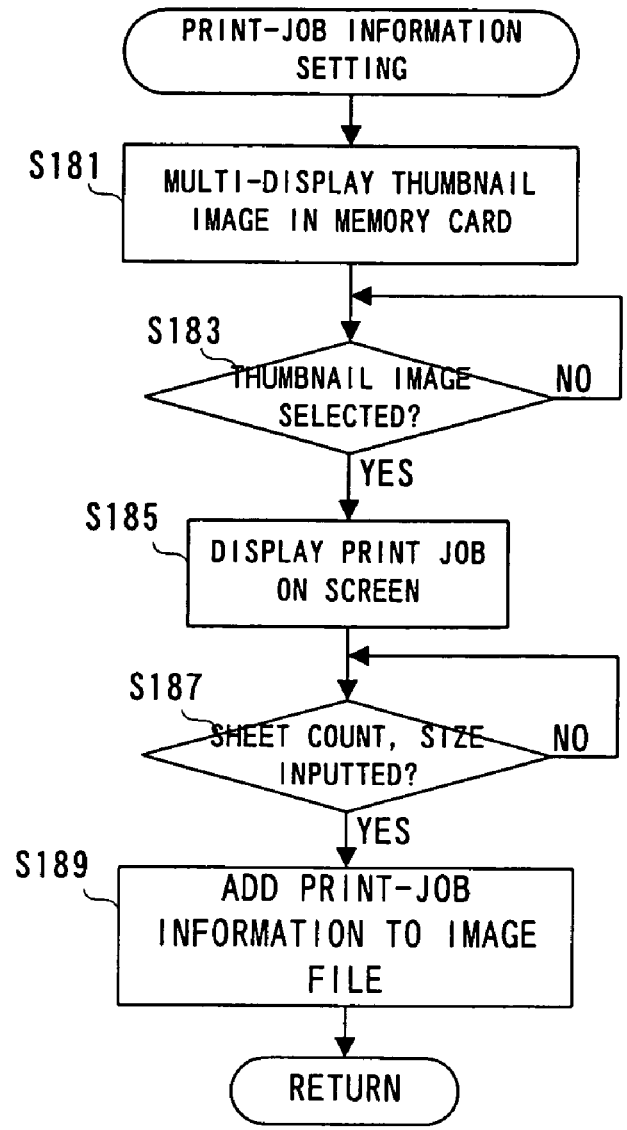
FIG. 10 is a flowchart one part of operation of still another embodiment of the invention.
Figure 16:
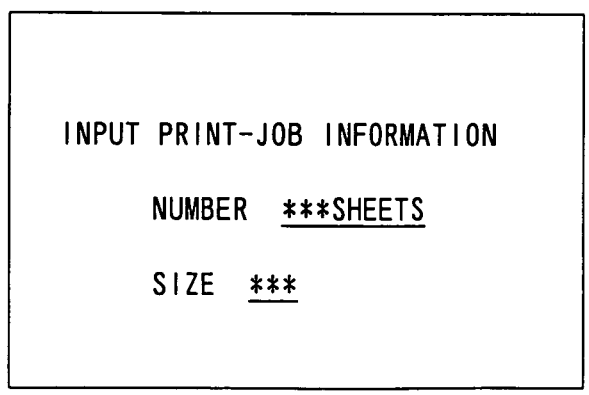
FIG. 16 is an illustrative view showing an example of a print-job information input screen.

In a digital camera of yet another embodiment, a subroutine shown in FIG. 10 is processed in the process of step S7 of FIG. 2. The CPU 32 first, in step S181, reproduces the compressed thumbnail image data contained in the image files stored in the memory card 34 and multi-displays a plurality of thumbnail images on the LCD monitor 28. If the operator herein selects any thumbnail image by the ten key 44, the CPU in step S183 determines "YES" and, in step S185, displays on the LCD monitor 28 a print-job screen shown in FIG. 16. In response, if the operator inputs a desired number and size of prints, the CPU advances from step S187 to step S189 to add print-job information comprising a number and size to the image file corresponding to the selected thumbnail image. After ending the process of step S189, the process returns to the button-input task of FIG. 2.

This embodiment is effective for the case where the server 52 side can afford to provide print service of image files. That is, if desired print-job information is added before transmission to the image file through the above process and then the image file is transmitted to the server 52, it is possible to positively, swiftly send a required size and number of sheets to the server 52.

Also, in any of the above embodiments, because the image files are under management in the Internet server 52, a plurality of persons if know a password can freely save or download an image file by utilization of their digital cameras. That is, the image files in the server 52 can be shared by a plurality of persons.

Incidentally, in the embodiments, although the communication circuit incorporates therein the function of a portable communication terminal, the communication interface only may be connected to the bus while communication with the provider be made through a separately prepared portable communication terminal. In this case, it can be considered for a method to connect between the digital camera and the portable communication terminal via a communication-cable wire or a near-distance wireless scheme such as of the Bluetooth technology.

Furthermore, although the above embodiments erased the image files immediately after transmission, the following countermeasure is to be considered in order to prevent the image files from disappearing due to transmission errors. Where the to-be-transmitted image file is an extremely important file, after the image file has been stored to the server the same image file is sent back from the server so that it is collated with an already-transmitted image file in the memory card. If their data contents agree, no communication error occurred is to be assumed and hence the already-transmitted image file is erased. If there is disagreement, the already-transmitted image file is again transmitted to the server.

Also, although the above embodiments exemplified the memory card as a recording medium on the camera side, the recording medium may be of every medium, including built-in flash memories and removable magneto-optical disks. Also, the image data in the image file may be non-compressive. Furthermore, the motion-image compression method may use, in place of the MOTIONJPEG, MPEG without problems. The user area on the server side is not limited to 10G bytes but may have higher capacity.

Furthermore, in the above embodiments, it is on the digital-camera side that obtains user-area vacant capacity information and compares a data amount of a to-be-transmitted image file with the vacant capacity information. In the invention, however, a data amount of a to-be-transmitted image file may be transmitted to and compared on the database server side so that a comparison result can be received from the database server to detect a relationship in magnitude between the vacant capacity and the data amount.

Furthermore, in the above other and still other embodiments, compressed thumbnail image data is taken out prior to transmission of an image file and the image file is erased from the memory card after transmitting the image file. The compressed thumbnail image data taken out of the image file can be stored to the memory card. However, the storage of the compressed thumbnail image data is not necessarily into the memory card. That is, a non-removable flash memory may be provided in the digital camera so that the compressed thumbnail image data taken out of the image file can be stored in the flash memory.

Also, an Internet communication function can be provided to the digital camera so that contraction can be made with a particular server prepared with image files having various-site geographical data. If accessing the server to input an address, it is possible to download an image file of a site of interest to the camera and display it on the LCD monitor. Even where outing without carrying a map and missing a way, a destination can be easily find out by accessing the map server.

Furthermore, where preparing communication-functioned digital cameras and one camera is carried to the outside while the other placed set in front of a safe in the home, dial-connection can be made as required using the carried digital camera to the in-home digital camera. The in-home digital camera is made take a still picture by remote control so that a taken image file is gotten through the server to confirm the image file with using the carried camera. This makes it possible to monitor whether a suspicious person is sneaking into the home or not.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera for recording to a recording medium an image file including a main-image and a size-reduced image which correspond to a subject taken, comprising:
    a first transmitter for transmitting to an external storage device the image file recorded in said recording medium;
    an eraser for erasing from said recording medium the image file transmitted by said first transmitter except for the size-reduced image;
    a displayer for displaying the size-reduced image(s) remaining in said recording medium when a display operation is carried out;
    a receiver for receiving, when a desired image is selected from among the size-reduced image(s) displayed by said displayer, the image file including the desired size-reduced image from said external storage device; and
    a recorder for recording to said recording medium the image file received by said receiver.

2. A digital camera according to claim 1, wherein said eraser includes a size-reduced image extractor for extracting the size-reduced image from the image file, a file eraser for erasing the image file after an extracting process of the size-reduced image extractor, and a size-reduced image recorder for recording to said recording medium the size-reduced image extracted by said size-reduced image extractor.

3. A digital camera according to claim 1, further comprising an image file selector for selecting a desired image file from said recording medium, wherein said first transmitter transmits the desired image file, and said eraser erases from said recording medium the desired image file except for the size-reduced image included in the desired image file.

4. A digital camera according to claim 1, further comprising an adder for adding to the image file print-job information which requests a printing operation, prior to transmitting the image file.

5. A digital camera according to claim 1, further comprising:
    a detector for detecting a relationship in magnitude between a vacant capacity of said external storage device and a size of the image file to be transmitted; and
    a second transmitter for transmitting an extension request for the vacant capacity to said external storage device based on a result of detection by said detector, wherein said first transmitter transmits the image file after the vacant capacity has been extended in response to the extension request.

6. A digital camera according to claim 1, further comprising:
    a prompter for prompting the vacant capacity to extend when the vacant capacity is lower than the size; and
    an instructor for instructing an extension of the vacant capacity, wherein said second transmitter transmits the extension request in response to an instruction by said instructor.

7. A digital camera according to claim 6, wherein the capacity of said external storage device is on sale on a predetermined-size basis, and the instruction of said instructor is an instruction for purchasing a capacity of the predetermined size.

* * * * *